United States Patent
La et al.

(10) Patent No.: US 12,374,239 B2
(45) Date of Patent: Jul. 29, 2025

(54) DISPLAY APPARATUS AND METHOD OF MANUFACTURING THE DISPLAY APPARATUS

(71) Applicant: Samsung Display Co., Ltd., Yongin-si (KR)

(72) Inventors: Sojeong La, Yongin-si (KR); Jaiku Shin, Yongin-si (KR); Sungchul Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/196,336

(22) Filed: May 11, 2023

(65) Prior Publication Data

US 2023/0368706 A1  Nov. 16, 2023

(30) Foreign Application Priority Data

May 16, 2022  (KR) ........................ 10-2022-0059850
Jul. 29, 2022  (KR) ........................ 10-2022-0095030

(51) Int. Cl.
G09F 9/30 (2006.01)
G06F 3/041 (2006.01)

(52) U.S. Cl.
CPC ............ G09F 9/301 (2013.01); G06F 3/0412 (2013.01)

(58) Field of Classification Search
None
See application file for complete search history.

(56) References Cited

U.S. PATENT DOCUMENTS

| | | | | |
|---|---|---|---|---|
| 9,348,450 | B1* | 5/2016 | Kim | H04M 1/0268 |
| 9,798,359 | B2 | 10/2017 | Seo et al. | |
| 9,954,985 | B2* | 4/2018 | Xu | H04M 1/0268 |
| 10,020,462 | B1* | 7/2018 | Ai | H10K 50/841 |
| 10,104,790 | B2* | 10/2018 | Lee | G06F 1/1616 |
| 10,188,004 | B2* | 1/2019 | Yeh | H05K 5/0217 |
| 10,817,030 | B2* | 10/2020 | Pelissier | G06F 1/1641 |
| 10,963,012 | B2* | 3/2021 | Shin | G06F 1/1652 |
| 11,199,736 | B2* | 12/2021 | Wang | G06F 1/1652 |
| 11,455,017 | B2* | 9/2022 | Liu | G06F 1/1626 |
| 2015/0102298 | A1* | 4/2015 | Namkung | H10K 77/111 438/34 |
| 2017/0054105 | A1* | 2/2017 | Alonso | H10K 71/00 |
| 2018/0158893 | A1* | 6/2018 | Tokuda | G02F 1/133305 |
| 2018/0375040 | A1* | 12/2018 | Li | G09F 9/301 |
| 2019/0064958 | A1* | 2/2019 | Liu | G06F 3/0446 |

(Continued)

FOREIGN PATENT DOCUMENTS

KR  10-1726306 B1  4/2017
KR  10-2021-0000359 A  1/2021

(Continued)

*Primary Examiner* — Patrick N Edouard
*Assistant Examiner* — Peijie Shen
(74) *Attorney, Agent, or Firm* — Womble Bond Dickinson (US) LLP

(57) ABSTRACT

A display apparatus includes a display module having a folding area and inflection areas respectively on both sides of the folding area in a first direction, a first layer on a surface of the display module opposite to a display surface thereof, and a second layer on a surface of the first layer opposite to the display module. An empty space is defined between the display module and the second layer in a thickness direction in the inflection area.

20 Claims, 14 Drawing Sheets

(56) References Cited

U.S. PATENT DOCUMENTS

| | | | |
|---|---|---|---|
| 2019/0140202 A1* | 5/2019 | Jin | H10K 50/844 |
| 2019/0339739 A1* | 11/2019 | Park | H04M 1/0218 |
| 2020/0037433 A1* | 1/2020 | Dong | G06F 1/1616 |
| 2020/0105168 A1* | 4/2020 | Choi | G06F 1/1656 |
| 2020/0152893 A1* | 5/2020 | Shin | H10K 71/80 |
| 2020/0209998 A1* | 7/2020 | Shin | G06F 1/1641 |
| 2020/0266367 A1* | 8/2020 | Wang | H10K 71/40 |
| 2020/0401275 A1 | 12/2020 | Shin et al. | |
| 2021/0104694 A1* | 4/2021 | Yee | B32B 15/08 |
| 2021/0124399 A1* | 4/2021 | Jeong | G09F 9/301 |
| 2021/0141418 A1* | 5/2021 | Min | G06F 1/1616 |
| 2021/0181918 A1* | 6/2021 | Wu | G06V 40/13 |
| 2021/0227704 A1* | 7/2021 | Bi | B32B 15/20 |
| 2021/0359038 A1* | 11/2021 | Gao | H10K 50/844 |
| 2021/0370645 A1* | 12/2021 | Gu | C09J 7/29 |
| 2021/0385959 A1* | 12/2021 | Wang | G06F 1/1656 |
| 2022/0043481 A1* | 2/2022 | Shin | G06F 1/1652 |
| 2022/0044599 A1* | 2/2022 | La | G06F 1/1641 |
| 2022/0102671 A1* | 3/2022 | Boardman | G06F 1/1656 |
| 2022/0130303 A1* | 4/2022 | Huang | G09G 3/035 |
| 2022/0197440 A1* | 6/2022 | Son | G06F 3/0418 |
| 2022/0209165 A1* | 6/2022 | Hyun | H10K 50/841 |
| 2022/0255046 A1* | 8/2022 | Fang | H10K 59/879 |
| 2022/0310749 A1* | 9/2022 | Huang | H10K 59/124 |
| 2023/0024214 A1* | 1/2023 | Tong | H10K 59/122 |
| 2023/0129007 A1* | 4/2023 | Liu | G06F 1/1637 |
| | | | 361/679.21 |
| 2023/0244335 A1* | 8/2023 | Lin | G06F 3/0412 |
| | | | 345/173 |

FOREIGN PATENT DOCUMENTS

| | | |
|---|---|---|
| KR | 10-2021-0103405 A | 8/2021 |
| KR | 10-2305912 B1 | 9/2021 |

* cited by examiner

DISPLAY APPARATUS AND METHOD OF MANUFACTURING THE DISPLAY APPARATUS

CROSS-REFERENCE TO RELATED APPLICATIONS

This application claims priority to and the benefit of Korean Patent Application No. 10-2022-0059850, filed in the Korean Intellectual Property Office on May 16, 2022, and Korean Patent Application No. 10-2022-0095030, filed in the Korean Intellectual Property Office on Jul. 29, 2022, the entire disclosure of both of which are incorporated herein by reference.

BACKGROUND

1. Field

Aspects of embodiments of the present disclosure relate to a display apparatus and a method of manufacturing the display apparatus.

2. Description of the Related Art

Recently, electronic devices have been widely used. Electronic devices are used in various ways, such as in mobile electronic devices and fixed electronic devices. Such electronic devices include display apparatuses to provide visual information, such as images or videos, to users to support various functions.

Recently, as other parts for driving display apparatuses have been miniaturized, the proportion of an electronic devices occupied by the display apparatuses has gradually increased. A structure that is bendable (e.g., bendable to a certain angle) from a flat state and is foldable about an axis is also under development.

Foldable display apparatuses may be folded or unfolded about a folding axis. A foldable display apparatus has a folding area that is foldable and bendable, and compression and tensile stress occur in the display apparatus due to the repeated bending of the folding area, which may cause defects, such as cracks.

The background art is technical information possessed by the inventors for the derivation of the present disclosure or obtained during the derivation of the present disclosure and is not necessarily known technology disclosed to the general public prior to the filing of the present disclosure.

SUMMARY

Embodiments of the present disclosure provide a display apparatus in which defects in the display apparatus, particularly a folding area of the display apparatus, due to folding of the display apparatus are prevented and a method of manufacturing the display apparatus.

However, this is only an example, the present disclosure is not limited to the above-described aspects and features.

Additional aspects and features of the present disclosure will be set forth, in part, in the description that follows and, in part, will be apparent from the description or may be learned by practice of the presented embodiments of the present disclosure.

According to an embodiment of the present disclosure, a display apparatus includes a display module having a folding area and inflection areas respectively on both sides of the folding area in a first direction, a first layer on a surface of the display module opposite to a display surface thereof, and a second layer on a surface of the first layer opposite to the display module. An empty space is defined between the display module and the second layer in a thickness direction in the inflection area.

The first layer may form a space portion defining the empty space below the inflection area.

A cross-sectional shape of the space portion in the first direction may be rectangular.

A cross-sectional shape of the space portion in the first direction may be semi-elliptical.

A cross-sectional shape of the space portion in the first direction may be concave-convex.

A plurality of space portions may be provided, and the plurality of space portions may be spaced apart from each other in the first direction.

The space portion may extend through an entire thickness of the first layer.

The space portion may extend through less than an entire thickness of the first layer.

The first layer may include: first protective member in the folding area with respect to the inflection area; and a second protective member that is different from the first protective member on a side opposite to the folding area.

A rigidity of the second protective member may be greater than a rigidity of the first protective member.

The inflection areas may include inflection points at which a rate of change of a slope of the display module changes from positive to negative or from negative to positive in the first direction when the display module is folded, and the empty space may be arranged to be symmetrical with respect to the corresponding inflection point.

A height of the space portion may be maximum at the inflection point.

Each of the first layer and the second layer may be separated in a center of the folding area.

The second layer may include a digitizer layer.

According to another embodiment of the present disclosure, a method of manufacturing a display apparatus includes preparing a display module having a folding area and inflection areas respectively on both sides of the folding area in a first direction, disposing a first layer having a space portion on a surface of the display module opposite to a display surface thereof to form an empty space below the inflection area, and disposing a second layer on a surface of the first layer opposite to the display module.

A cross-sectional shape of the space portion in the first direction may be concave-convex.

The space portion may extend through a portion of a thickness of the first layer.

The disposing of the first layer may include arranging a first protective member in the folding area with respect to the inflection area and arranging a second protective member, which is different from the first protective member, on a side opposite to the folding area.

A rigidity of the second protective member may be greater than a rigidity of the first protective member.

The inflection areas may include inflection points at which a rate of change of a slope of the display module changes from positive to negative or from negative to positive in the first direction when the display module is folded, and the space portion may be arranged to be symmetrical with respect to the corresponding inflection point.

The disposing of the first layer may include disposing the first layer so that a thickness of the first layer is minimum at the inflection point.

The second layer may include a digitizer layer.

Other aspects and features of the present disclosure will become apparent through the detailed description, claims, and accompanying drawings.

BRIEF DESCRIPTION OF THE DRAWINGS

The above and other aspects and features of the present disclosure will be more apparent from the following description taken in conjunction with the accompanying drawings, in which.

DETAILED DESCRIPTION

Figure 1:
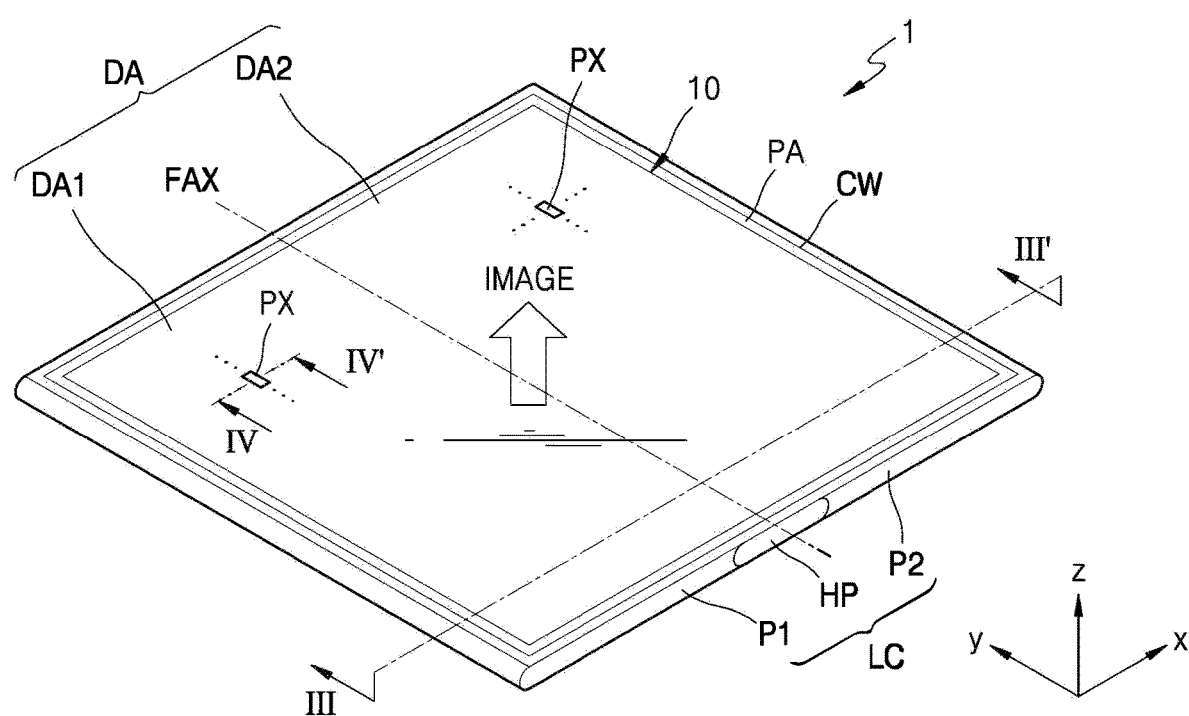
FIGS. 1 and 2 are perspective views schematically illustrating a display apparatus according to an embodiment.

Reference will now be made, in detail, to embodiments, examples of which are illustrated in the accompanying drawings. The presented embodiments may have different forms, and neither the described embodiments nor the present disclosure should be construed as being limited to the descriptions set forth herein. Accordingly, embodiments are merely described below, by referring to the figures, to explain aspects and features of the present description.

Because the present description allows for various changes and numerous embodiments, certain embodiments will be illustrated in the drawings and described in detail in the written description. Aspects and features of the present disclosure, and methods of achieving them, will be clarified with reference to embodiments described below in detail with reference to the drawings. However, the present disclosure is not limited to the following embodiments and may be embodied in various forms.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The X-axis, the Y-axis, and the Z-axis are not limited to three axes of the rectangular coordinate system and may be interpreted in a broader sense. For example, the X-axis, the Y-axis, and the Z-axis may be perpendicular to one another or may represent different directions that are not perpendicular to one another.

When an embodiment may be implemented differently, a specific process order may be performed differently from the described order. For example, two consecutively described processes may be performed at substantially at the same time or performed in an order opposite to the described order.

Figure 2:
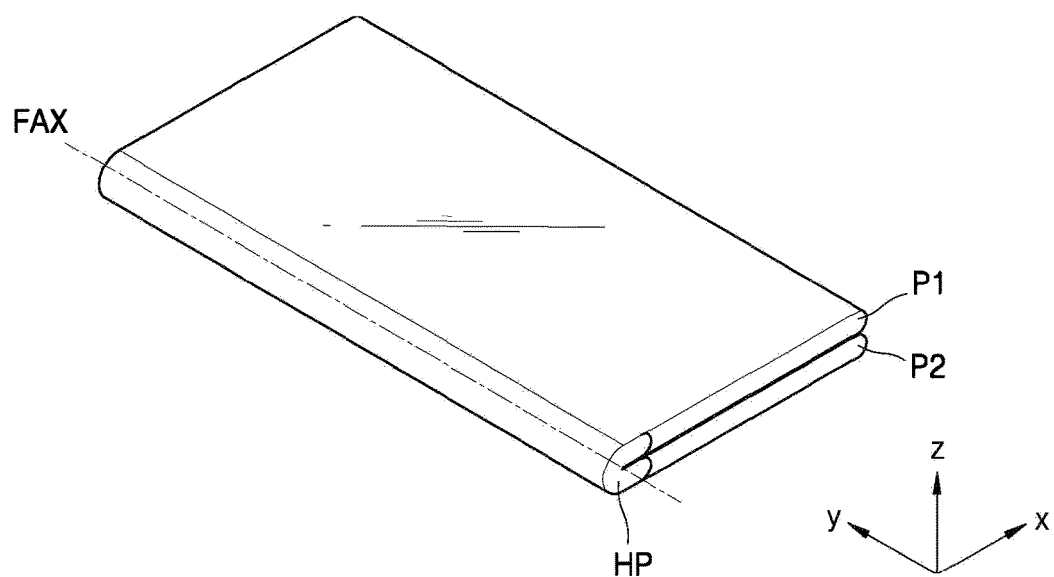

FIGS. 1 and 2 are perspective views schematically illustrating a display apparatus 1 according to an embodiment. In more detail, FIG. 1 illustrates the display apparatus 1 in an unfolded state, and FIG. 2 illustrates the display apparatus 1 in a folded state.

Referring to FIGS. 1 and 2, the display apparatus 1 is configured to display a moving image or a still image. The display apparatus 1 may be used as a display screen for (or in) portable electronic devices, such as mobile phones, smartphones, tablet personal computers (PCs), mobile communication terminals, electronic organizers, e-books, portable multimedia players (PMPs), navigations, and ultra-mobile PCs (UMPCs). In other embodiments, the display apparatus 1 may be used as display screens of various products, such as televisions, laptops, monitors, billboards, and Internet of Things (IoT) devices. In addition, the display apparatus 1, according to an embodiment, may be used in wearable devices, such as smart watches, watch phones, glasses-type displays, and head mounted displays (HMDs). Also, the display apparatus 1, according to an embodiment, may be used in dashboards of automobiles, center information displays (CIDs) on the center fascia or dashboards of automobiles, room mirror displays replacing (or supplementing) side mirrors of automobiles, and displays on the rear sides of front seats to act as entertainment devices for backseat passengers of automobiles.

The display apparatus 1 may have an approximately rectangular shape, as illustrated in FIG. 1. For example, as illustrated in FIG. 1, the display apparatus 1 may have a rectangular planar shape, as a whole, having a short side extending in a first direction (e.g., the x direction or the −x direction) and a long side extending in a second direction (e.g., the y direction or the −y direction). In an embodiment, an area at where the short side extending in the first direction (e.g., the x direction or the −x direction) meets the long side extending in the second direction (e.g., the y direction or the −y direction) may form a right angle shape and/or may have a rounded shape with a certain curvature. The planar shape of the display apparatus 1 is not limited to the rectangular shape and may be other polygonal, circular, or elliptical shapes.

The display apparatus 1 may include a lower cover LC, a display panel 10, and a cover window CW.

The lower cover LC may form the lower surface of the display apparatus 1. The lower cover LC may include plastic and/or metal. The lower cover LC may have a first portion P1 and a second portion P2, which support the display panel 10. The lower cover LC may be foldable about a folding axis FAX defined between the first portion P1 and the second portion P2. In an embodiment, the lower cover LC may include a hinge portion HP. The hinge portion HP may be between the first portion P1 and the second portion P2.

The display panel 10 may have a display area DA and a peripheral area PA. The display area DA may be where images are displayed. Pixels PX may be arranged in the display area DA. The display panel 10 may provide images by using light emitted from the pixels PX. The pixels PX may each emit light by using a display element. In an embodiment, the pixels PX may each emit red light, green light, or blue light. In another embodiment, the pixels PX may each emit red light, green light, blue light, or white light.

The peripheral area PA may be a non-display area at where images are not provided. The peripheral area PA may at least partially surround (e.g., surround in a plan view or extend around a periphery of) the display area DA. For example, the peripheral area PA may completely surround the display area DA. A driver configured to provide an electrical signal to the pixels PX and/or a power line configured to supply power to the pixels PX may be arranged in the peripheral area PA. For example, a scan driver configured to apply a scan signal to the pixels PX may be arranged in the peripheral area PA. Also, a data driver configured to apply a data signal to the pixels PX may be arranged in the peripheral area PA.

The display area DA may have a first display area DA1 and a second display area DA2 respectively on both sides (e.g., opposite sides) of the folding axis FAX crossing the display area DA. The first display area DA1 and the second display area DA2 may be respectively located on the first portion P1 and the second portion P2 of the lower cover LC. The display panel 10 may provide a first image and a second image by using light emitted from the pixels PX respectively arranged in the first display area DA1 and the second display area DA2. In an embodiment, the first image and the second image may be portions of one image provided through the display area DA of the display panel 10. Alternatively, in another embodiment, the display panel 10 may provide a first image and a second image, which are independent of each other.

The display panel 10 may be foldable about the folding axis FAX. In an embodiment, when the display panel 10 is folded, the first display area DA1 and the second display area DA2 of the display panel 10 may face each other (e.g., in-folded). In another embodiment, when the display panel 10 is folded, the first display area DA1 and the second display area DA2 of the display panel 10 may face directions opposite to each other (e.g., outfolded).

For example, in an embodiment, the display panel 10 may be in-foldable or out-foldable about the folding axis FAX. The term "in-folding" means that the display panel 10 is folded in the +z direction with respect to the folding axis FAX, and the term "out-folding" means that the display panel 10 is folded in the −z direction with respect to the folding axis FAX. In other words, the term "in-folding" means that the upper surfaces of the cover window CW disposed on the display panel 10 are folded to face each other, and the term "out-folding" means that the lower surfaces of the cover window CW disposed on the display panel 10 are folded to face each other. In this case, the lower surface of the cover window CW may refer to a surface closer to a substrate (see, e.g., 100 in FIG. 3) in the z direction than the upper surface of the cover window CW.

Although the embodiment illustrated in FIGS. 1 and 2 have the folding axis FAX extending in the second direction (e.g., the y direction), the present disclosure is not limited thereto. In an embodiment, the folding axis FAX may extend in the first direction (e.g., the x direction) crossing the second direction (e.g., they direction). In another embodiment, the folding axis FAX on the xy plane may extend in a direction crossing the first direction (e.g., the x direction) and the second direction (e.g., the y direction).

Also, although the embodiment illustrated in FIGS. 1 and 2 has one folding axis FAX, the present disclosure is not limited thereto. In an embodiment, the display panel 10 may be foldable about two folding axes FAX crossing the display area DA. For example, when the display panel 10 is folded about two folding axes FAX, the display panel 10 may be in-folded about one folding axis FAX and out-folded about the other folding axis FAX. Alternatively, the display panel 10 may be all in-folded or out-folded about the two folding axes FAX. In an embodiment, the display panel 10 may be foldable about a plurality of folding axes FAX crossing the display area DA. In such an embodiment, the display panel 10 may be in-folded or out-folded about the respective folding axes FAX.

The cover window CW may be disposed on the display panel 10 to cover the display panel 10. The cover window CW may be foldable or bendable according to an external force without cracking or otherwise being damaged. When the display panel is folded about the folding axis FAX, the cover window CW may also be folded to cover the display panel 10.

Figure 3:
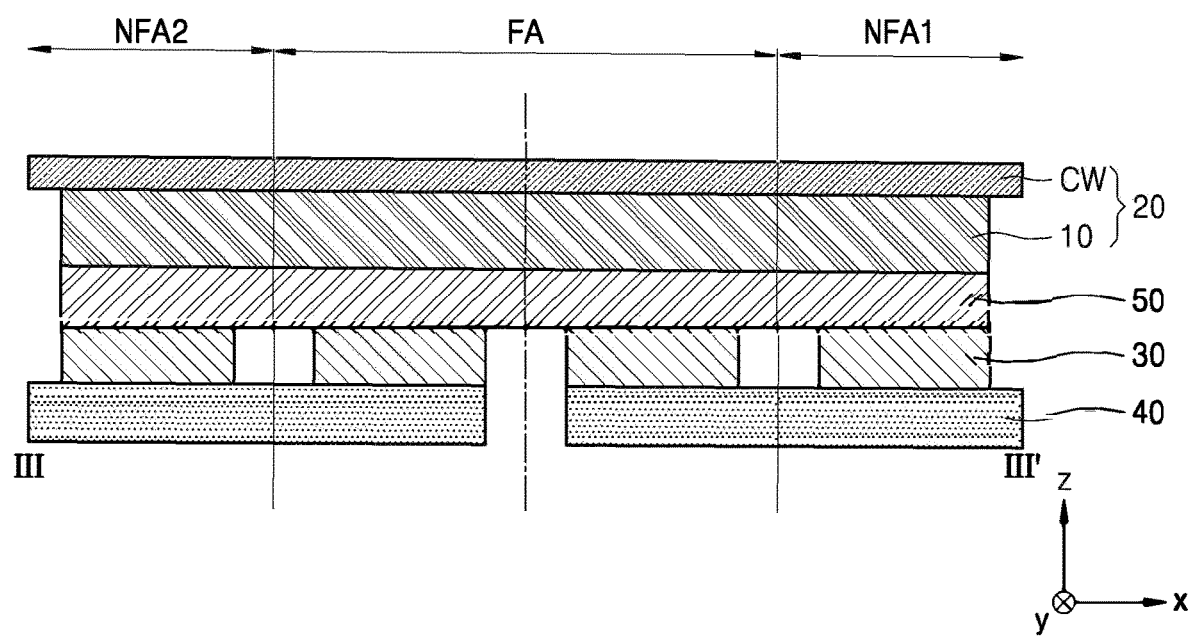
FIG. 3 is a cross-sectional view of a portion of the display apparatus shown in FIG. 1 taken along the line III-III' of FIG. 1.

FIG. 3 is a cross-sectional view schematically illustrating a portion of the display apparatus 1 according to an embodiment. FIG. 3 corresponds to a cross-section of the display apparatus 1 shown in FIG. 1 taken along the line III-III' of FIG. 3.

Referring to FIG. 3, the display apparatus 1 may include a display module 20, a first layer 30, a second layer 40, and a third layer 50.

The display module 20 may include the display panel 10 and the cover window CW disposed on the display panel 10. The display panel 10 may be configured to display information processed by the display apparatus 1. For example, the display panel 10 may be configured to display execution screen information of an application running on the display apparatus 1 and/or user interface (UI) and graphic user interface (GUI) information according to the execution screen information.

The display panel 10 may include a display element. For example, the display panel 10 may be an organic light-emitting display panel using an organic light-emitting diode (LED), a micro light-emitting diode display panel using a micro LED, a quantum dot light-emitting display panel using a quantum dot LED including a quantum dot emission layer, or an inorganic light-emitting display panel using an inorganic LED including an inorganic semiconductor. Hereinafter, an embodiment in which the display panel 10 is an organic light-emitting display panel using an organic LED as a display element will be described in detail.

The cover window CW may be disposed on the display panel 10. The cover window CW may protect the display panel 10. In an embodiment, the cover window CW may be a flexible window. The cover window CW may protect the display panel 10 and may be easily bent according to an external force without cracking or otherwise being damaged. The cover window CW may include at least one of glass, sapphire, and plastic. The cover window CW may be, for example, ultra-thin glass (UTG) or colorless polyimide (CPI). In an embodiment, the cover window CW may have a structure in which a flexible polymer layer is disposed on one surface of a glass substrate or may include only a polymer layer.

The cover window CW may be bonded to the display panel 10 by an adhesive member. The adhesive member may be a pressure sensitive adhesive (PSA). The adhesive member may be a transparent adhesive member, such as an optically clear adhesive (OCA) film. The adhesive member may be formed on the display panel 10 by various methods. For example, the adhesive member may be formed in the form of a film and bonded to the upper portion of the display panel 10 (e.g., an upper portion of an encapsulation layer) or may be formed in the form of a material and applied to the upper portion of the display panel 10.

The first layer 30 may be disposed on one surface of the display panel 10, for example, on a surface opposite to the display surface on which the cover window CW is disposed. In an embodiment, the first layer 30 may be a cushion layer. The cushion layer may absorb an external shock and prevent damage to the display panel 10. The cushion layer may include polymer resin, such as polyurethane, polycarbonate, polypropylene, or polyethylene, or may include an elastic material, such as a sponge formed by foam-molding rubber, a urethane-based material, or an acrylic material. In other embodiments, the cushion layer may include a metal material, such as molybdenum (Mo), aluminum (Al), copper (Cu), and/or titanium (Ti).

The second layer 40 may be disposed below the first layer 30, that is, on the side of the first layer 30 opposite to the display panel 10. In an embodiment, the second layer 40 may be a digitizer layer. The digitizer layer may include a body layer and/or a pattern layer. The digitizer layer may be configured to sense a signal input from an external electronic pen or the like (such as a human finger) through the pattern layer. The digitizer layer may be configured to sense the intensity, direction, and the like of the signal input from the electronic pen or the like. In an embodiment, the lower cover LC described above may be disposed below the second layer 40. In some embodiments, a protective layer may be provided between the second layer 40 and the lower cover LC. Hereinafter, for convenience of description, parts below the second layer 40 are omitted, as illustrated in FIG. 3.

In an embodiment, the third layer 50 may be between the display panel 10 and the first layer 30. For example, the third layer 50 may be a protective film layer or a support plate layer. The third layer 50 may be disposed below the display panel 10 and configured to support and protect the display panel 10. In an embodiment, the third layer 50 may have various structures according to the folding or non-folding of the display apparatus 1 and the folding shape. For example, the third layer 50 may be integrally provided, as illustrated in FIG. 3. In another embodiment, the third layer 50 may include a folding structure in the folding area FA. The folding structure may have a variable shape or a variable length in the folding area FA when the display apparatus 1 is folded. The folding structure may include a pattern portion having an opening, may include an uneven shape, or may include links rotatably connected to each other. However, the present disclosure is not limited thereto.

In an embodiment, the third layer 50 may include at least one of glass, polymer resin, and metal. In an embodiment, the folding structure may include at least one of glass, polymer resin, and metal. In an embodiment, the folding structure of the third layer 50 may include a metal material, and the remaining portions of the third layer 50 excluding (or other than) the folding structure may include a non-metal material. However, the present disclosure is not limited thereto.

As described above, the third layer 50, such as the protective film layer, the first layer 30, such as the cushion layer, and the second layer 40, such as the digitizer layer, may be sequentially disposed below the display panel 10. However, the present disclosure is not limited thereto, and it will be understood that one or more layers may be further disposed below the display panel 10. Hereinafter, for convenience of description, an embodiment in which the third layer 50, such as the protective film layer, the first layer 30, such as the cushion layer, and the second layer 40, such as the digitizer layer, are sequentially disposed below the display panel 10 will be primarily described.

Figure 4:
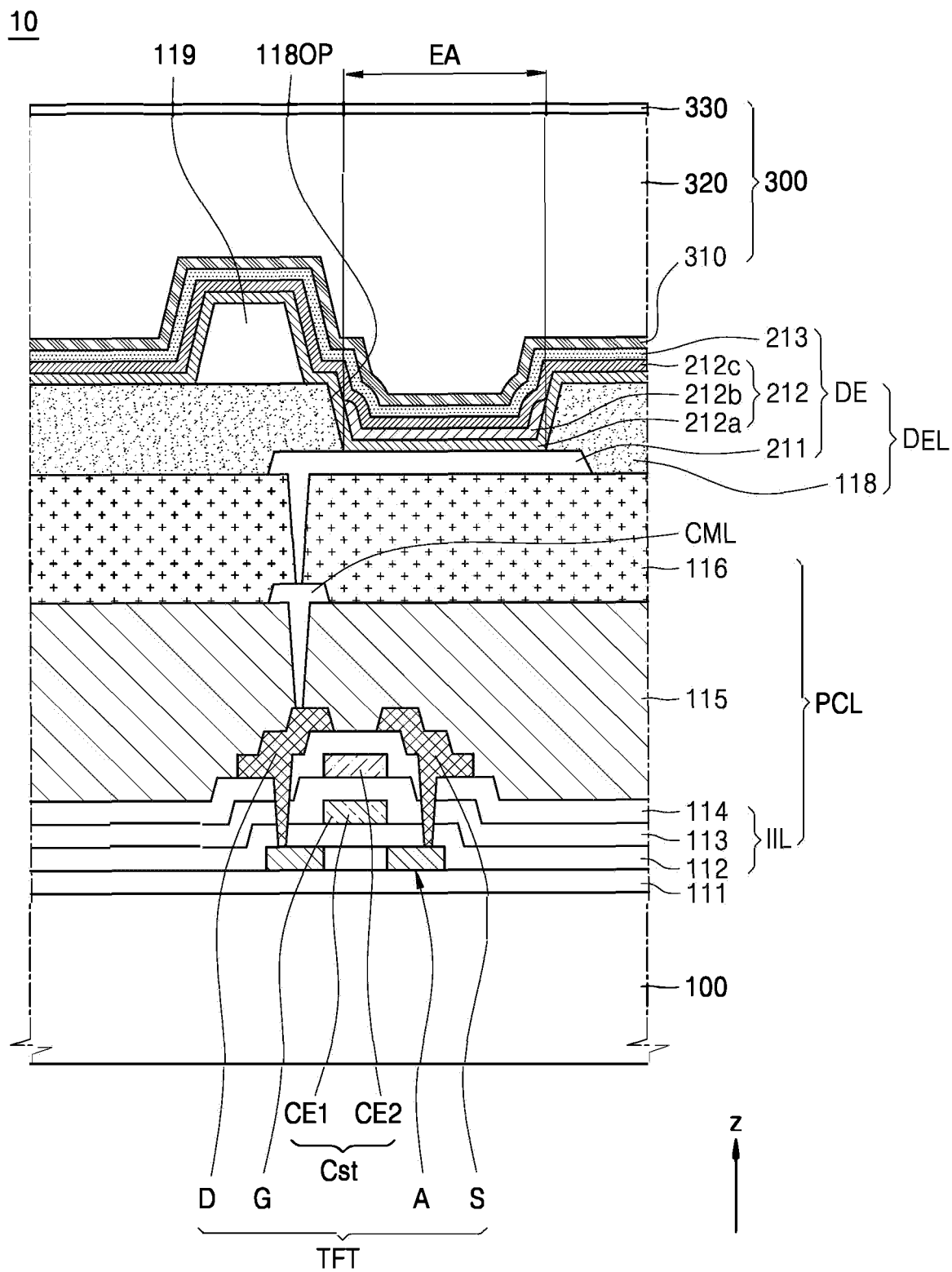
FIG. 4 is a cross-section of a portion of a display panel shown in FIG. 1 taken along the line IV-IV' of FIG. 1.

FIG. 4 is a cross-section of the display panel 10 shown in FIG. 1 taken along the line IV-IV' of FIG. 1 according to an embodiment.

Referring to FIG. 4, the display panel 10 may include a substrate 100, a pixel circuit layer PCL, a display element layer DEL, and an encapsulation layer 300.

The substrate 100 may include glass or polymer resin, such as polyethersulfone, polyarylate, polyetherimide, polyethylene naphthalate, polyethylene terephthalate, polyphenylene sulfide, polyimide, polycarbonate, cellulose triacetate, or cellulose acetate propionate. In an embodiment, the substrate 100 may have a multilayer structure including a base layer and a barrier layer, each including a polymer resin as described above. The substrate 100 including a polymer resin may be flexible, rollable, and bendable.

The buffer layer 111 may be disposed on the substrate 100. The buffer layer 111 may include an inorganic insulating material, such as silicon nitride, silicon oxynitride, and silicon oxide, and may include a single layer or layers including the inorganic insulating material as described above.

The pixel circuit layer PCL may be disposed on the buffer layer 111. The pixel circuit layer PCL may include a thin-film transistor TFT included in a pixel circuit and may include an inorganic insulating layer IIL, a first planarization layer 115, and a second planarization layer 116, which are disposed below and/or above elements of the thin-film transistor TFT. The inorganic insulating layer IIL may include a first gate insulating layer 112, a second gate insulating layer 113, and an interlayer insulating layer 114.

The thin-film transistor TFT may include a semiconductor layer A, and the semiconductor layer A may include polysilicon. In some embodiments, the semiconductor layer A may include amorphous silicon, an oxide semiconductor, or an organic semiconductor. The semiconductor layer A may have a channel region, and a drain region and a source region respectively on both (e.g., opposite) sides of the channel region. A gate electrode G may overlap the channel region.

The gate electrode G may include a low-resistance metal material. The gate electrode G may include a conductive material, such as molybdenum (Mo), aluminum (Al), copper (Cu), titanium (Ti), and the like, and may include a single layer or layers including a conductive material as described above.

The first gate insulating layer 112 between the semiconductor layer A and the gate electrode G may include an inorganic insulating material, such as silicon oxide (e.g., $SiO_2$), silicon nitride ($SiN_x$), silicon oxynitride (SiON), aluminum oxide (e.g., $Al_2O_3$), titanium oxide (e.g., $TiO_2$), tantalum oxide (e.g., $Ta_2O_5$), hafnium oxide (e.g., $HfO_2$), or zinc oxide ($ZnO_x$). Zinc oxide ($ZnO_x$) may be ZnO and/or $ZnO_2$.

The second gate insulating layer 113 may be provided to cover the gate electrode G. Similar to the first gate insulating layer 112, the second gate insulating layer 113 may include an inorganic insulating material, such as silicon oxide (e.g., $SiO_2$), silicon nitride ($SiN_x$), silicon oxynitride (SiON), aluminum oxide (e.g., $Al_2O_3$), titanium oxide (e.g., $TiO_2$), tantalum oxide (e.g., $Ta_2O_5$), hafnium oxide (e.g., $HfO_2$), and/or zinc oxide ($ZnO_x$). Zinc oxide ($ZnO_x$) may be ZnO and/or $ZnO_2$.

An upper electrode CE2 of a storage capacitor Cst may be disposed on the second gate insulating layer 113. The upper electrode CE2 may overlap the gate electrode G therebelow. In such an embodiment, the gate electrode G and the upper electrode CE2 overlapping each other with the second gate insulating layer 113 therebetween may constitute the storage capacitor Cst of the pixel circuit. For example, the gate electrode G may act as a lower electrode CE1 of the storage capacitor Cst. As such, the storage capacitor Cst may overlap the thin-film transistor TFT. In another embodiment, the storage capacitor Cst may not overlap the thin-film transistor TFT.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may include a single layer or layers including the material described above.

The interlayer insulating layer 114 may cover the upper electrode CE2. The interlayer insulating layer 114 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). Zinc oxide ($ZnO_x$) may be ZnO and/or $ZnO_2$. The interlayer insulating layer 114 may include a single layer or layers including the inorganic insulating material described above.

A drain electrode D and a source electrode S may be respectively disposed on the interlayer insulating layer 114. The drain electrode D and the source electrode S may each include a material having good conductivity. The drain electrode D and the source electrode S may each include a conductive material including molybdenum (Mo), aluminum (Al), copper (Cu), titanium (Ti), and the like, and may include a single layer or layers including a conductive material as described above. In an embodiment, the drain electrode D and the source electrode S may each have a multilayer structure of Ti/Al/Ti.

The first planarization layer 115 may be disposed to cover the drain electrode D and the source electrode S. The first planarization layer 115 may include an organic insulating layer. The first planarization layer 115 may include an organic insulating material selected from a general-purpose polymer, such as polymethylmethacrylate (PMMA) or polystyrene (PS), polymer derivatives having a phenolic group, an acrylic polymer, an imide-based polymer, an aryl ether-based polymer, an amide-based polymer, a fluorine-based polymer, a p-xylene-based polymer, a vinyl alcohol-based polymer, and any blend thereof.

A connection electrode CML may be disposed on the first planarization layer 115. The connection electrode CML may be connected to the drain electrode D or the source electrode S through a contact hole (e.g., a contact opening) in the first planarization layer 115. The connection electrode CML may include a material having good conductivity. The connection electrode CML may include a conductive material including molybdenum (Mo), aluminum (Al), copper (Cu), titanium (Ti), and the like, and may include a single layer or layers including a conductive material as described above. In an embodiment, the connection electrode CML may have a multilayer structure of Ti/Al/Ti.

The second planarization layer 116 may be disposed to cover the connection electrode CML. The second planarization layer 116 may include an organic insulating layer. The second planarization layer 116 may include an organic insulating material selected from a general-purpose polymer, such as PMMA or PS, polymer derivatives having a phenolic group, an acrylic polymer, an imide-based polymer, an aryl ether-based polymer, an amide-based polymer, a fluorine-based polymer, a p-xylene-based polymer, a vinyl alcohol-based polymer, and any blend thereof.

The display element layer DEL may be disposed on the pixel circuit layer PCL. The display element layer DEL may include a display element DE. The display element DE may be an organic light-emitting diode (OLED). A pixel electrode 211 of the display element DE may be electrically connected to the connection electrode CML through a contact hole (e.g., contact opening) in the second planarization layer 116.

The pixel electrode 211 may include a conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). In some embodiments, the pixel electrode 211 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or any compound thereof. In some embodiments, the pixel electrode 211 may further include a layer including ITO, IZO, ZnO, or $In_2O_3$ above and/or below the reflective layer.

A pixel defining layer 118 having an opening 1180P exposing the central portion of the pixel electrode 211 may be disposed on the pixel electrode 211. The pixel defining layer 118 may include an organic insulating material and/or an inorganic insulating material. The opening 1180P may define an emission area for light emitted from the display element DE. For example, the width of the opening 1180P may correspond to the width of the emission area EA.

In an embodiment, the pixel defining layer 118 may include a light blocking material and may be provided in black. The light blocking material may include carbon black, carbon nanotubes, a resin or paste including black dye, metal particles (e.g., nickel, aluminum, molybdenum, and any alloy thereof), metal oxide particles (e.g., chromium oxide), or metal nitride particles (e.g., chromium nitride). When the pixel defining layer 118 includes a light blocking material, the reflection of external light due to the metal structures below the pixel defining layer 118 may be reduced.

A spacer 119 may be disposed on the pixel defining layer 118. The spacer 119 may prevent damage to the substrate 100 during manufacturing of the display apparatus. A mask sheet may be used to manufacture the display panel. When the mask sheet enters the inside of the opening 1180P of the pixel defining layer 118, or when a deposition material is deposited on the substrate 100 in close contact with the pixel defining layer 118, a defect in which a portion of the substrate 100 is damaged or broken by the mask sheet may be prevented by the spacer 119.

The spacer 119 may include an organic insulating material, such as polyimide. In other embodiments, the spacer 119 may include an inorganic insulating material, such as silicon nitride or silicon oxide, or may include an organic insulating material and an inorganic insulating material.

In an embodiment, the spacer 119 may include a material that is different from a material of the pixel defining layer 118. In another embodiment, the spacer 119 may include the same material as that of the pixel defining layer 118. In such an embodiment, the pixel defining layer 118 and the spacer 119 may be formed together in a mask process using a halftone mask or the like.

An intermediate layer 212 may be disposed on the pixel defining layer 118. The intermediate layer 212 may include an emission layer 212b arranged in the opening 118OP in the pixel defining layer 118. The emission layer 212b may include a high molecular weight organic material or a low molecular weight organic material that emits light of a certain color.

A first functional layer 212a and a second functional layer 212c may be disposed below and above the emission layer 212b, respectively. The first functional layer 212a may include, for example, a hole transport layer (HTL) or may include an HTL and a hole injection layer (HIL). The second functional layer 212c is an element disposed on the emission layer 212b. The second functional layer 212c may include an electron transport layer (ETL) and/or an electron injection layer (EIL). The first functional layer 212a and/or the second functional layer 212c may be a common layer completely covering the substrate 100, like an opposite electrode 213 to be described below. In various embodiments, the first functional layer 212a and/or the second functional layer 212c may be omitted.

The opposite electrode 213 may include a conductive material having a low work function. For example, the opposite electrode 213 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or any alloy thereof. In some embodiments, the opposite electrode 213 may further include a layer including ITO, IZO, ZnO, or $In_2O_3$ on the (semi)transparent layer including a material as described above.

In some embodiments, a capping layer (not illustrated) may be further disposed on the opposite electrode 213. The capping layer may include LiF, an inorganic material, and/or an organic material.

The encapsulation layer 300 may be disposed on the opposite electrode 213. In an embodiment, the encapsulation layer 300 may include at least one inorganic encapsulation layer and at least one organic encapsulation layer. FIG. 4 illustrates an embodiment in which the encapsulation layer 300 includes a first inorganic encapsulation layer 310, an organic encapsulation layer 320, and a second inorganic encapsulation layer 330, which are sequentially stacked in this order.

The first inorganic encapsulation layer 310 and the second inorganic encapsulation layer 330 may each include at least one inorganic material selected from aluminum oxide, titanium oxide, tantalum oxide, hafnium oxide, zinc oxide, silicon oxide, silicon nitride, and silicon oxynitride. The organic encapsulation layer 320 may include a polymer-based material. The polymer-based material may include acrylic resin, epoxy-based resin, polyimide, polyethylene, and the like. In an embodiment, the organic encapsulation layer 320 may include acrylate.

A touch sensor layer may be disposed on the encapsulation layer 300. The touch sensor layer may be configured to obtain coordinate information according to an external input, for example, a touch event.

Also, an optical function layer may be disposed on the touch sensor layer. The optical function layer may reduce the reflectance of light (e.g., external light) incident from the outside toward the display apparatus and/or may improve the color purity of light emitted from the display apparatus. In an embodiment, the optical function layer may include a retarder and/or a polarizer. The retarder may be a film-type retarder or a liquid crystal coating-type retarder and may include a $\lambda/2$ retarder and/or a $\lambda/4$ retarder. The polarizer may be a film-type polarizer or a liquid crystal coating-type polarizer. The film-type retarder or polarizer may include a stretched synthetic resin film, and the liquid crystal coating-type retarder or polarizer may include liquid crystals arranged in a certain array. The retarder and the polarizer may each further include a protective film.

The cover window (see, e.g., CW in FIG. 3) may be disposed on the display panel 10. When the touch sensor layer and/or the optical function layer are present, the cover window (see, e.g., CW in FIG. 3) may be disposed on the touch sensor layer and/or the optical function layer.

Figure 5:
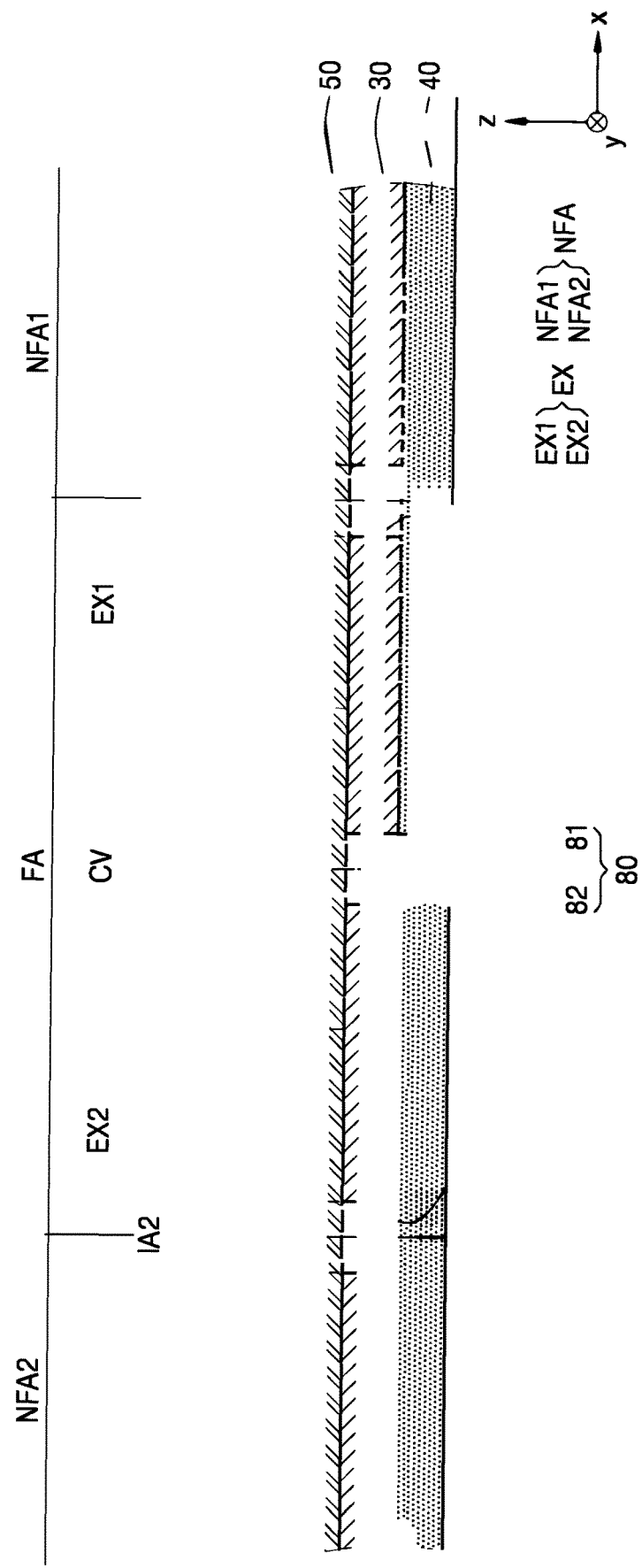
FIGS. 5 and 6 are cross-sectional views schematically illustrating a display apparatus according to an embodiment.
Figure 6:
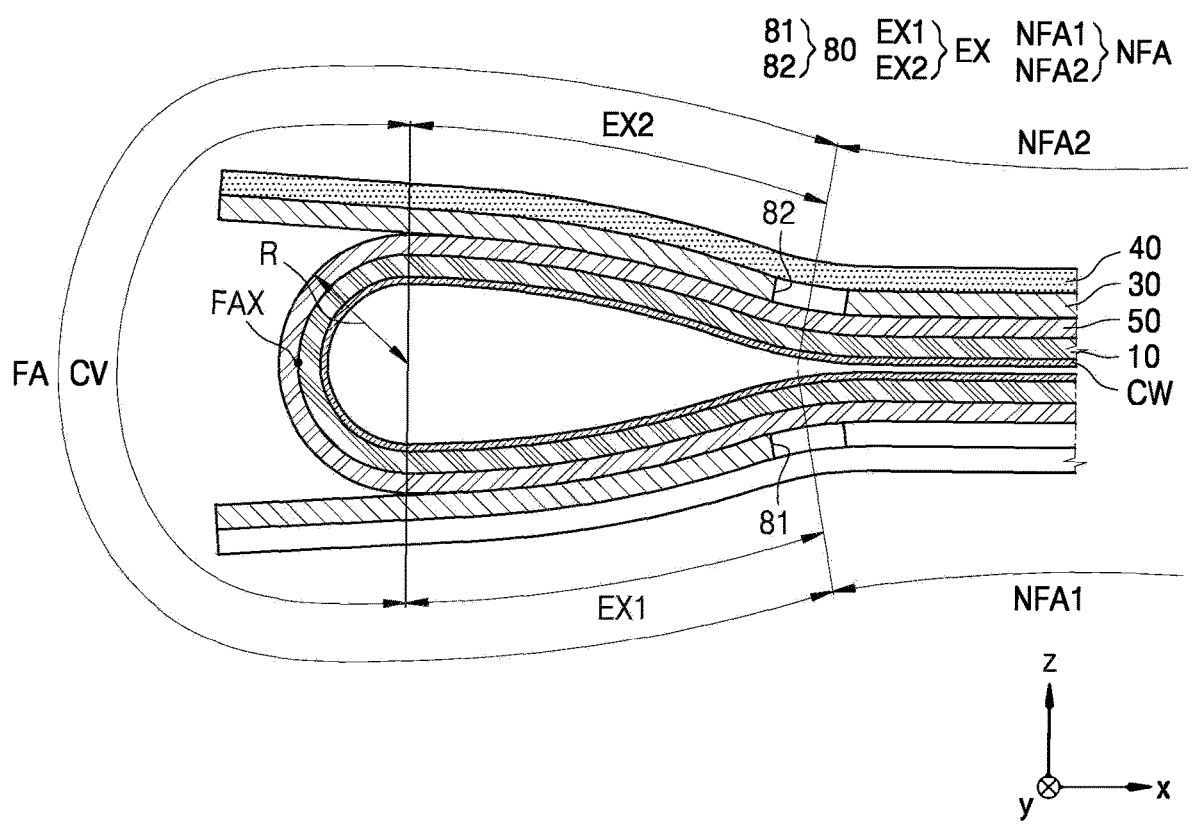

FIGS. 5 and 6 are cross-sectional views schematically illustrating a display apparatus according to an embodiment. FIG. 5 illustrates a state in which the display apparatus is unfolded (e.g., is in an unfolded state), and FIG. 6 illustrates a state in which the display apparatus is folded (e.g., is in a folded state).

Referring to FIGS. 5 and 6, the display apparatus 1 may have a folding area FA and a non-folding area NFA. The folding area FA and the non-folding area NFA may be areas defined as extending in the thickness direction (e.g., the z direction in FIG. 5) of the display apparatus. In other words, the display panel 10 may also have the folding area FA and the non-folding area NFA.

The folding area FA is an area including the folding axis FAX and may be an area that is foldable about the folding axis FAX to have a curvature (e.g., to have a certain curvature). For example, the folding area FA may have a curvature area CV that may be bent to have a curvature and to substantially form a portion of a circular arc. Also, the folding area FA may have extension areas EX extending from both ends of the curvature area CV, for example, a first extension area EX1 connected to (e.g., extending from) one end of the curvature area CV and a second extension area EX2 connected to (e.g., extending from) the other end of the curvature area CV. The extension areas EX may have a curved surface that is continuous to the curvature of the curvature area CV. As illustrated in FIG. 6, the first extension area EX1 and the second extension area EX2 may be arranged to face each other when the display apparatus is folded.

The non-folding area NFA may be connected to both ends of the folding area FA, such as the first extension area EX1 and the second extension area EX2. The non-folding area NFA may not be substantially folded. For example, the non-folding area NFA may be substantially flat. The expression "the non-folding area NFA is substantially flat" may mean that portions excluding a portion of the non-folding area NFA adjacent to the folding area FA are flat (e.g., remain flat). The non-folding area NFA may include a first non-folding area NFA1 connected to the first extension area EX1 and a second non-folding area NFA2 connected to the second extension area EX2. As illustrated in FIG. 6, the first non-folding area NFA1 and the second non-folding area NFA2 may be arranged to face each other when the display apparatus is folded.

The display panel 10 may be folded in a dumbbell shape, as illustrated in FIG. 6. For example, the display panel 10 may be bent to have a curvature (e.g., a certain curvature) in the curvature area CV. The first extension area EX1 and the second extension area EX2 may extend to approach each other while facing each other in a direction away from the curvature area CV. The first non-folding area NFA1 and the second non-folding area NFA2 may face each other and may be substantially parallel to each other. Accordingly, the shape of the display panel 10 when folded may be a dumbbell shape.

The folding area FA and the non-folding area NFA may overlap the display area (see, e.g., DA in FIG. 1). For example, the folding area FA may overlap a portion of the first display area DA1 and the second display area DA2. Also, the first non-folding area NFA1 may overlap a portion of the first display area DA1, and the second non-folding area NFA2 may overlap a portion of the second display area DA2.

The third layer 50 may be disposed below the display panel 10, and the first layer 30 may be disposed below the third layer 50. The second layer 40 may be disposed below the first layer 30. In an embodiment, the first layer 30 and the second layer 40 may be arranged to be cut in the center of the folding area FA (e.g., to be separated from the third layer 50) when the display panel 10 is folded. For example, the first layer 30 and the second layer 40 may be spaced apart from each other in the center of the folding area FA. This may prevent the first layer 30, such as the protective film layer, and the second layer 40, such as the digitizer layer, from being deformed or damaged due to compression and tensile stress caused by folding in the folding area FA.

Figure 7:
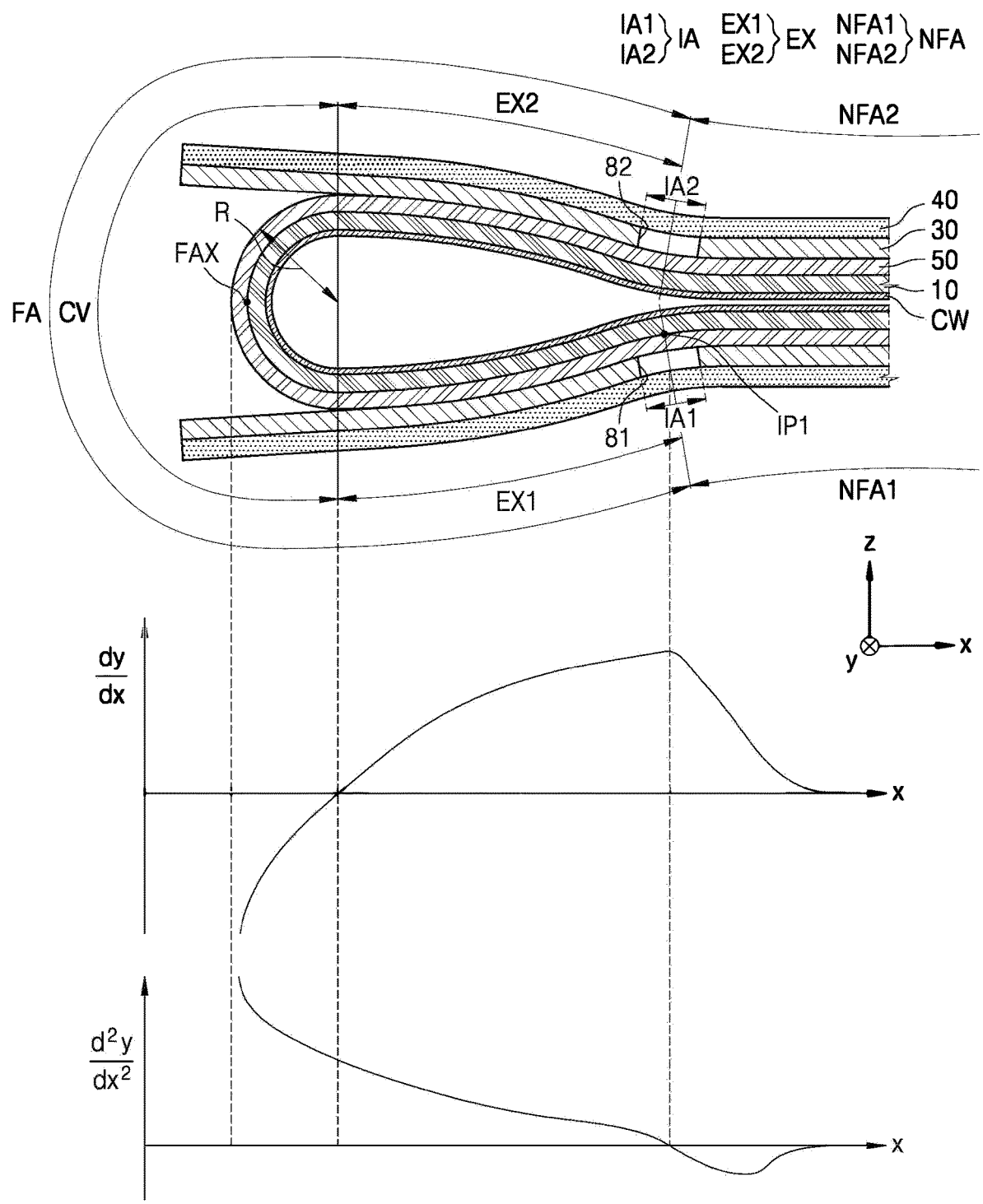
FIG. 7 is a diagram schematically illustrating a display apparatus according to an embodiment.

FIG. 7 is a diagram schematically illustrating the display apparatus according to an embodiment.

Referring to FIG. 7, the display panel 10 may further include an inflection area IA. The inflection area IA may be arranged at both ends of the folding area FA in the first direction (e.g., the x direction in FIG. 5). In an embodiment, the inflection area IA may have a first inflection area IA1 arranged at one end of the folding area FA and a second inflection area IA2 arranged at the other end of the folding area FA. Because the first inflection area IA1 is similar to the second inflection area IA2, the first inflection area IA1 will be primarily described below and the same description should be applicable to the second inflection area IA2.

The first inflection area IA1 may be arranged at one end of the folding area FA and may overlap a portion of the folding area FA and a portion of the first non-folding area NFA1. For example, the first inflection area IA1 may overlap a portion of the first extension area EX1 and a portion of the first non-folding area NFA1. When the display panel 10 is folded in a dumbbell shape, as illustrated in FIG. 7, the first inflection area IA1 may refer to an area at where the direction of the curved surface of the display panel 10 changes. For example, the display panel 10, specifically the curvature area CV and the first extension area EX1, may be bent in a concave direction in the folding area FA and may start to be bent in the convex direction at the first inflection area IA1.

The upper graph in FIG. 7 schematically shows a rate of change of the displacement of the display panel 10 in the +y direction with respect to the displacement of the display panel 10 in the +x direction, that is, dy/dx or y', in the curvature area CV, the first extension area EX1, and the first non-folding area NFA1 when the display panel 10 is folded. This may correspond to the curved slope of the display panel 10 in FIG. 7. The slope dy/dx is $-\infty$ at the center of the curvature area CV and may pass 0 at one end of the curvature area CV and gradually increase along the first extension area EX1. Also, the slope dy/dx may have a maximum value at the connection point between the first extension area EX1 and the first non-folding area NFA1 and may converge to 0 along the first non-folding area NFA1. In this case, the point having the maximum value of the slope, for example, the boundary point between the first expansion area EX1 and the first non-folding area NFA1 may be defined as a first inflection point IP1. The first inflection point IP1 may be included in the first inflection area IA1. For example, the first extension area EX1 and the first non-folding area NFA1 may be separated from each other based on the first inflection point IP1, and the first inflection area IA1 may overlap a portion of the first extension area EX1 and a portion of the first non-folding area NFA1.

Also, the lower graph in FIG. 7 schematically shows the rate of change of the slope of the display panel 10, that is, $d^2y/dx^2$ or y", when the display panel 10 is folded. This may be a derivative of the slope (dy/dx) with respect to x, or a second-order derivative of the displacement in the y direction with respect to x. The rate $d^2y/dx^2$ of change of the slope is Do at the center of the curvature area CV and may gradually decrease along one end of the curvature area CV and the first extension area EX1. In this case, the rate $d^2y/dx^2$ of change of the slope may change from positive to negative at the first inflection point IP1. That is, the rate $d^2y/dx^2$ of change of the slope at the first inflection point IP1 may be zero.

Generally, because the display apparatus includes a plurality of layers, for example, the protective film layer, the digitizer layer, etc., the thickness of the display apparatus including the display panel 10 is increased. Accordingly, when the display apparatus is folded, in particular, when the display apparatus is folded in a dumbbell shape, the folding curvature R may decrease in the folding area FA. When the folding curvature R decreases, the cover window CW and/or the display panel 10 of the display module 20 may be cracked due to increased stress due to bending.

Referring back to FIGS. 5 to 7, the display apparatus according to an embodiment may include a space portion 80 in the inflection area IA. The space portion 80 may be an empty space between the display panel 10 and the second layer 40.

In an embodiment, the space portion 80 may be arranged within the first layer 30 in the inflection area IA. For example, the space portion 80 may have a first space portion 81 in the first inflection area IA1 and a second space portion 82 in the second inflection area IA2. Because the first space portion 81 is similar to the second space portion 82, the first space portion 81 will be primarily described for convenience of explanation and the same description should apply to the second space portion 82.

The first layer 30 may be spaced apart from the first inflection area IA1 in the first direction (e.g., the x direction in FIG. 5) to form a space, and the periphery of the first space portion 81 may be defined by the first layer 30. The first space portion 81 may extend from the first inflection area IA1 in the second direction (e.g., the y direction in FIG. 5). For example, the first space portion 81 may be parallel to the extending direction of the folding axis FAX. In such an embodiment, the cross-section of the first space portion 81 cut in the first direction (e.g., the x direction in FIG. 5) may be rectangular. However, the present disclosure is not limited thereto. It will be understood that the cross-section of the first space portion 81 may have various shapes within the scope of the present disclosure. For example, the first space portion 81 may be formed in a tapered shape in which the width of the first space portion 81 gradually widens or narrows in the thickness direction (e.g., the z direction in FIG. 5).

Also, in an embodiment, the first space portion 81 may be arranged to be symmetrical with respect to the first inflection point IP1. For example, as illustrated in FIG. 5, the length of the first space portion 81 extending toward the folding area FA with respect to the first inflection point IP1 may be equal to the length of the first space portion 81 extending toward the first non-folding area NFA1.

Because the display apparatus according to an embodiment includes the space portion 80 in the first layer 30, the folding curvature R of the display apparatus may be maintained. As illustrated in FIG. 6, the total thickness of the display panel 10, the cover window CW, the first layer 30, the second layer 40, and the third layer 50 in the inflection area IA may be less than the thickness of the other portions due to the space (e.g., the open space) defined by the space portion 80. Accordingly, each layer may be bent more in the inflection area IA by using the space defined by the space portion 80, and thus, the angle between the first extension area EX1 and the second extension area EX2 may be increased. Compared to an example in which the space portion 80 is omitted, a larger folding curvature R may be maintained even though several layers are disposed below the display panel 10. Accordingly, in the display apparatus according to embodiments of the present disclosure, the stress concentration due to the folding in the folding area FA may be reduced, and the occurrence of cracks in various layers, such as the cover window CW and the display panel 10, may be prevented.

FIGS. 8 to 11 are cross-sectional views schematically illustrating display apparatuses according to various embodiments. FIGS. 8 to 11 illustrate a state in which the display apparatus is unfolded, similar to FIG. 5. Because the display apparatuses according to these embodiments are similar to the display apparatus 1 described above, differences therebetween will be primarily described.

Figure 8:
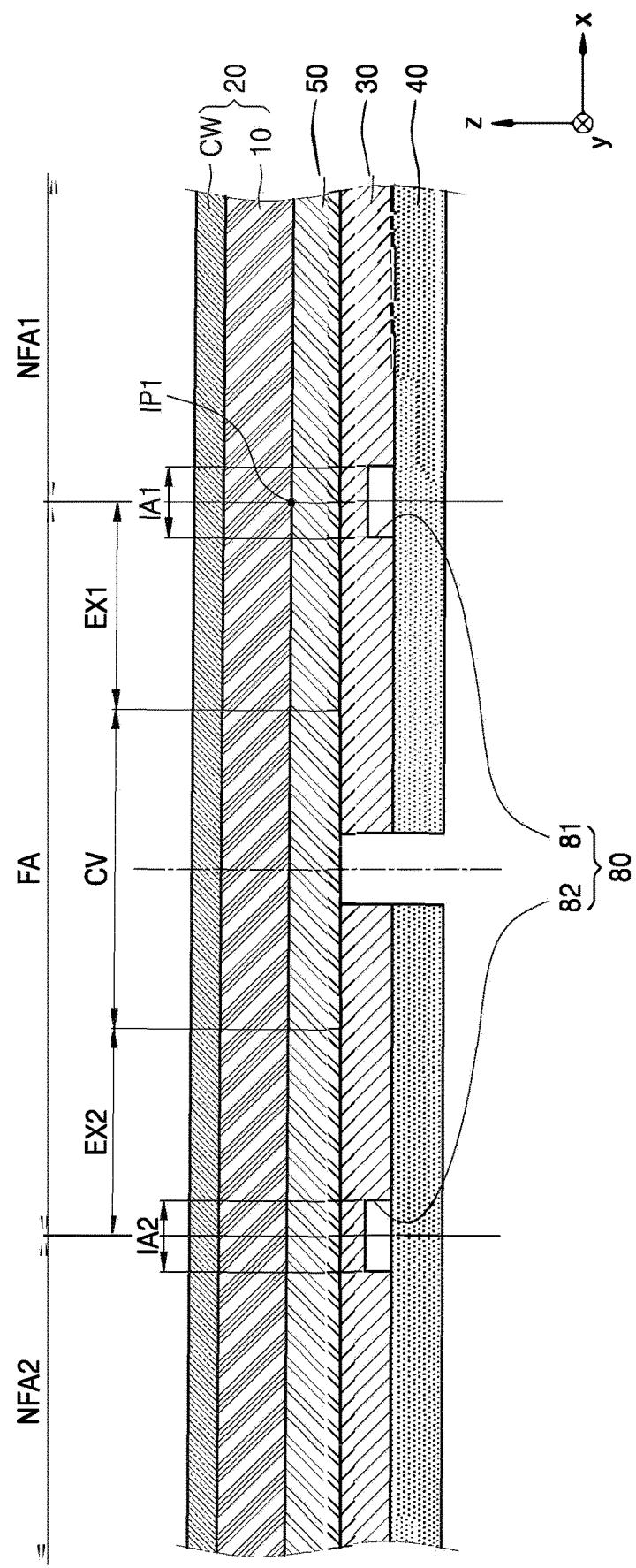
FIGS. 8 and 11 are cross-sectional views schematically illustrating display apparatuses according to various embodiments.

Referring to the embodiment shown in FIG. 8, a first space portion (e.g., a groove) 81 may be formed only in a portion of a thickness of a first layer 30 (e.g., may not extend entirely through the first layer 30) in a first inflection area IA1. The first space portion 81 may be formed only in a portion of the thickness of the first layer 30 so as to form a space in a surface in contact with a second layer 40, as illustrated in FIG. 8. Accordingly, the first space portion 81 having a concave shape may be formed from the lower surface (the −z direction surface in FIG. 8) of the first layer 30. In another embodiment, the first space portion 81 may be formed only in a portion of the thickness of the first layer 30 so as to form a space in a surface in contact with a third layer 50. Accordingly, the first space portion 81 having a concave shape may be formed from the upper surface (the +z direction surface in FIG. 8) of the first layer 30. Hereinafter, for convenience of explanation, an embodiment in which the first space portion 81 having a concave shape is formed from the lower surface of the first layer 30, as illustrated in FIG. 8, will be primarily described.

Figure 9:
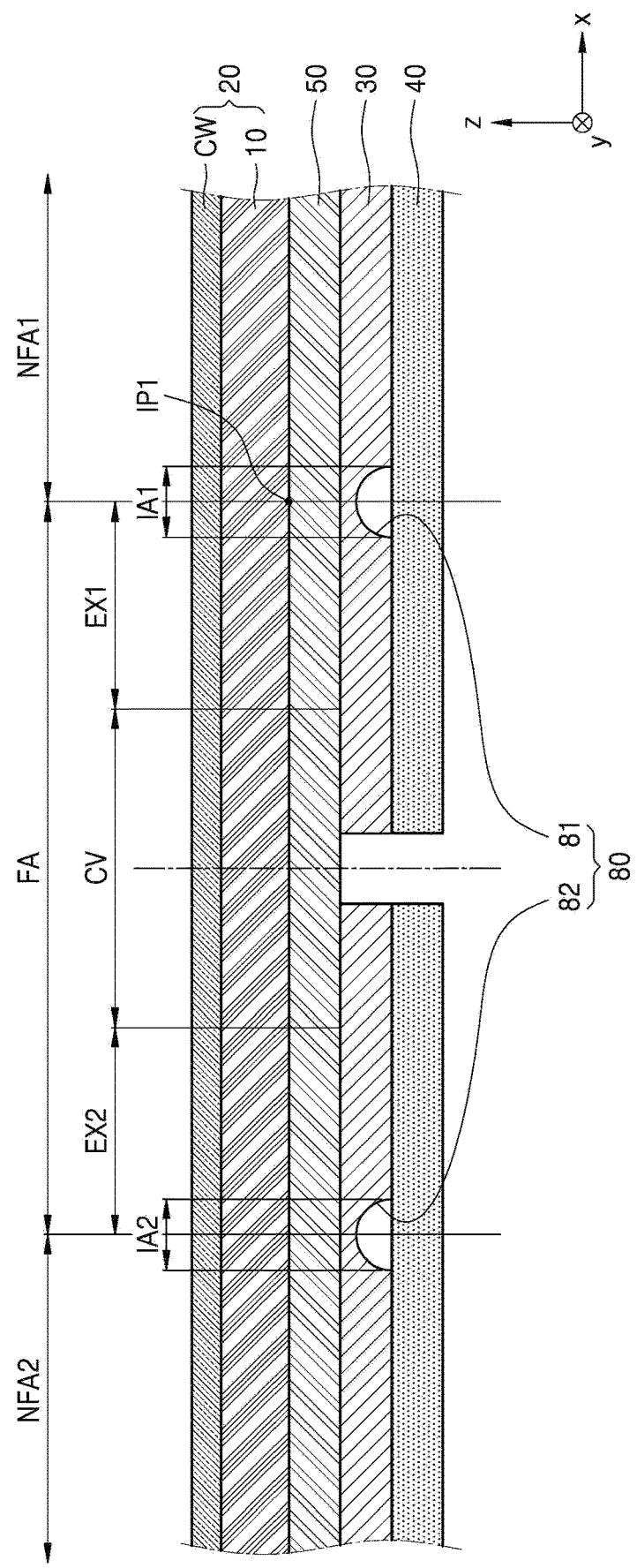

Referring to the embodiment shown in FIG. 9, the cross-section of the first space portion 81 cut in the first direction (e.g., in the x direction in FIG. 9) may be semi-elliptical or semi-circular. As described above, the first space portion 81 may be arranged to be symmetrical with respect to the first inflection point IP1. Accordingly, the thickness (e.g., the height) of the first space portion 81 may be the greatest at the first inflection point IP1. In other words, the thickness of the first layer 30 may be the smallest at the first inflection point IP1. Because the first space portion 81 is formed so that the thickness of the first layer 30 is minimized (or smallest) at the first inflection point IP1, various layers including the display panel 10 in the first inflection area IA1 may be bent more with respect to the first inflection point IP1. Accordingly, the folding curvature R may be further secured.

Also, because the cross-section of the first space portion 81 is formed to be semi-elliptical or semi-circular, a stress concentration that may occur at the corner of the first space portion 81 when the first layer 30 including the first space portion 81 is folded may be dispersed.

Figure 10:
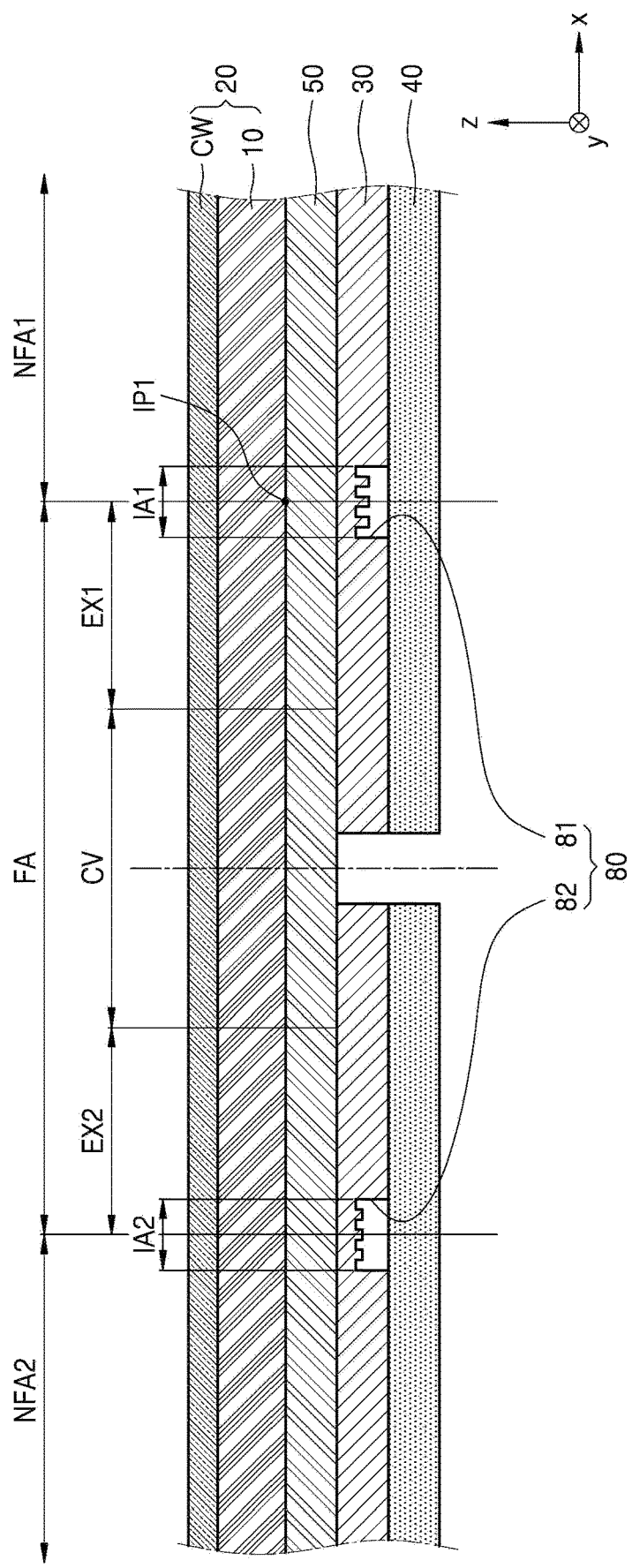

Referring to the embodiment shown in FIG. 10, the cross-section of the first space portion 81 cut in the first direction (e.g., in the x direction in FIG. 10) may be concave-convex (e.g., may be a sawtooth pattern or may have alternating protrusions and recesses in a surface thereof of the first layer 30). As described above, the first space portion 81 may be arranged to be symmetrical with respect to the first inflection point IP1. In this embodiment, the thickness of the first layer 30 may be maintained at a reference level or higher in the first inflection area IA1 to increase the folding curvature R by providing the first space portion 81 while securing sufficient rigidity.

Figure 11:
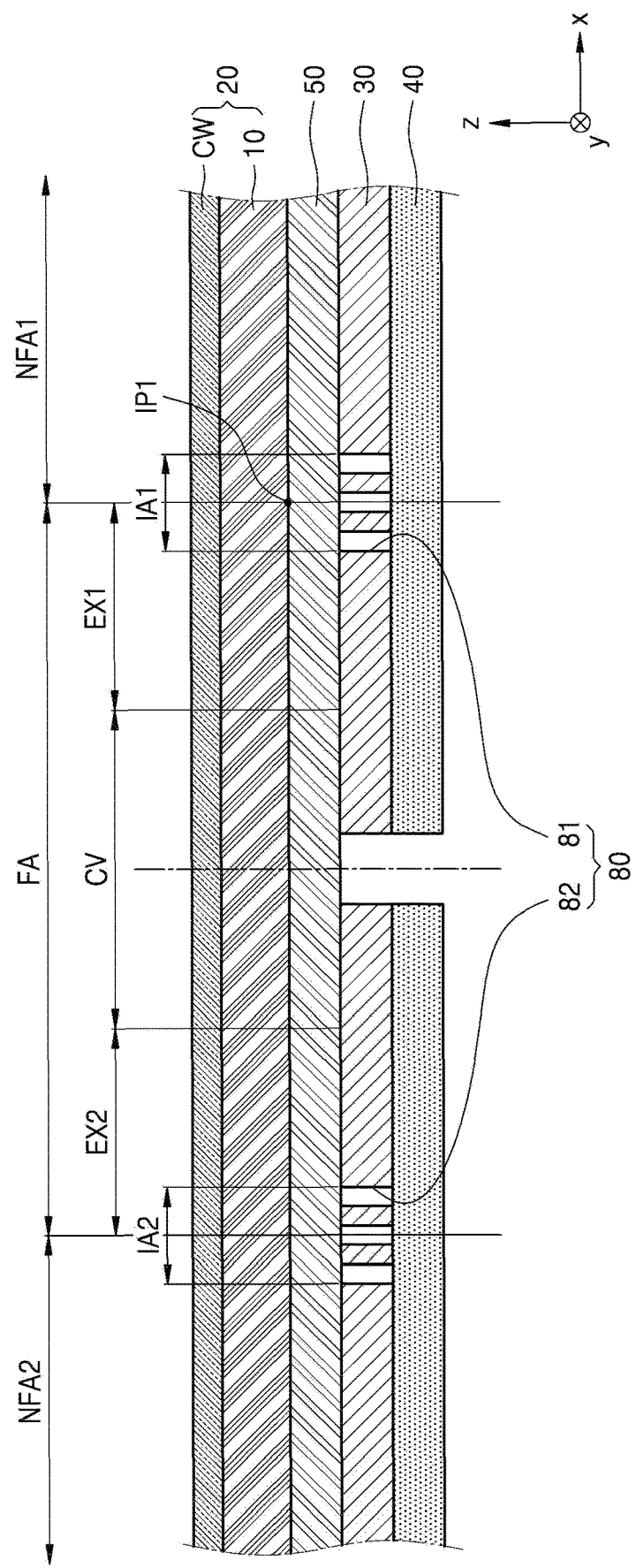

Referring to the embodiment shown in FIG. 11, a plurality of first space portions 81 may be provided. Each of the first space portions 81 may extend in the second direction (e.g., the y direction in FIG. 11) as described above, and the first space portions 81 may be spaced apart from each other in the first direction (e.g., the x direction in FIG. 11). As described above, each of the first space portions 81 may be formed through the entire thickness of (e.g., may extend entirely through) the first layer 30. For example, each of the first space portions 81 may pass through the first layer 30. However, in another embodiment, each of the first space portions 81 may be formed through a portion of the thickness of (e.g., may not extend entirely through) the first layer 30, similar to the embodiments described above with respect to FIGS. 8 to 10. Also, as described above, the first space portions 81 may be arranged to be symmetrical with respect to the first inflection point IP1.

Figure 12:
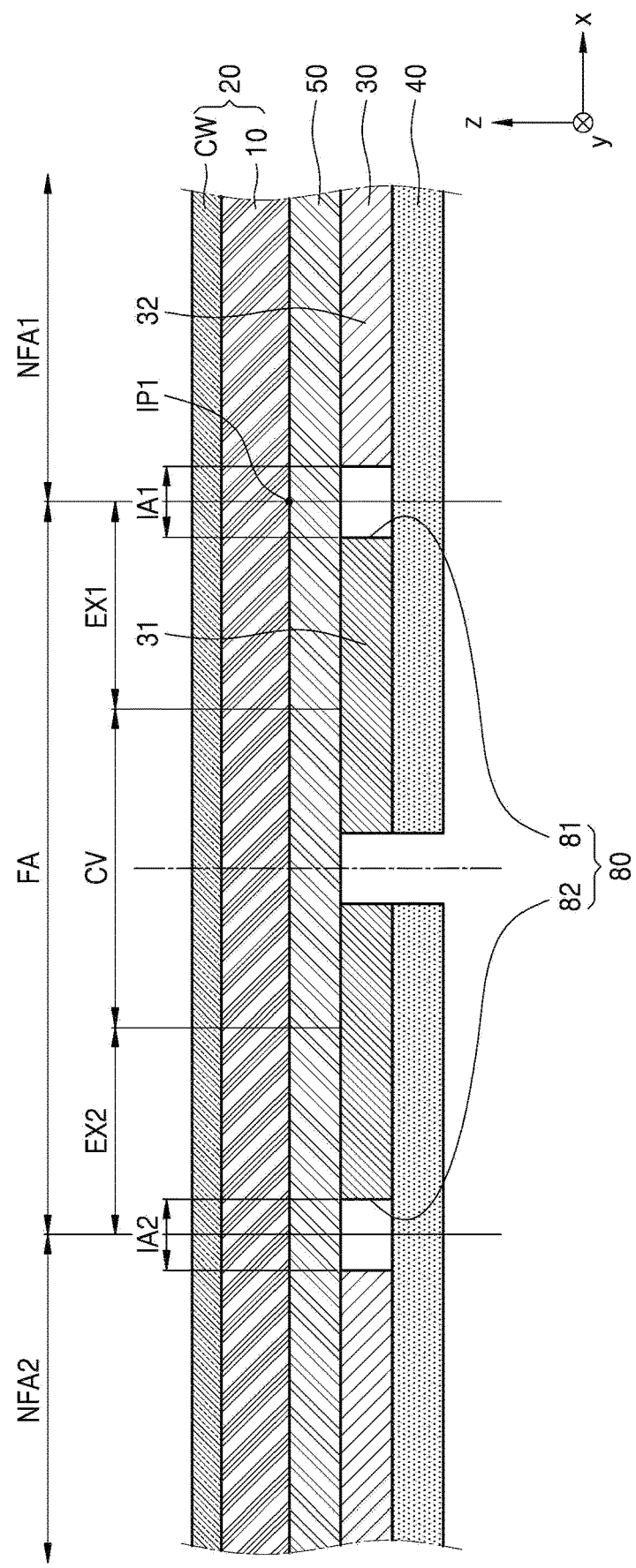
FIG. 12 is a cross-sectional view schematically illustrating a display apparatus according to another embodiment.

FIG. 12 is a cross-sectional view schematically illustrating a display apparatus according to another embodiment. FIG. 12 illustrates a state in which the display apparatus is unfolded, similar to FIG. 5. Because the display apparatus according to this embodiment is similar to the display apparatuses described above, differences therebetween will be primarily described.

Referring to FIG. 12, as described above with reference to FIG. 5, a first space portion 81 in a first inflection area IA1 may be disposed through (e.g., may extend through) an entire thickness of a first layer 30. In such an embodiment, a material of the first layer 30 may be different from a material arranged in a folding area FA and a first non-folding area NFA1 with respect to (e.g., separated by) the first inflection area IA1. In other words, in the first layer 30, the material arranged in the folding area FA may be different from the material arranged in the first non-folding area NFA1 with respect to the first space portion 81. For example, a first protective member 31 may be arranged in the folding area FA of the first layer 30, and a second protective member 32 that is different from the first protective member 31 may be arranged in the first non-folding area NFA1. In an embodiment, the rigidity of the second protective member 32 may be greater than the rigidity of the first protective member 31. Accordingly, the first layer 30 (e.g., the first protective member 31) may be bent more flexibly in the folding area FA, and a supporting function may be strengthened with greater rigidity in the non-folding area NFA1.

Figure 13:
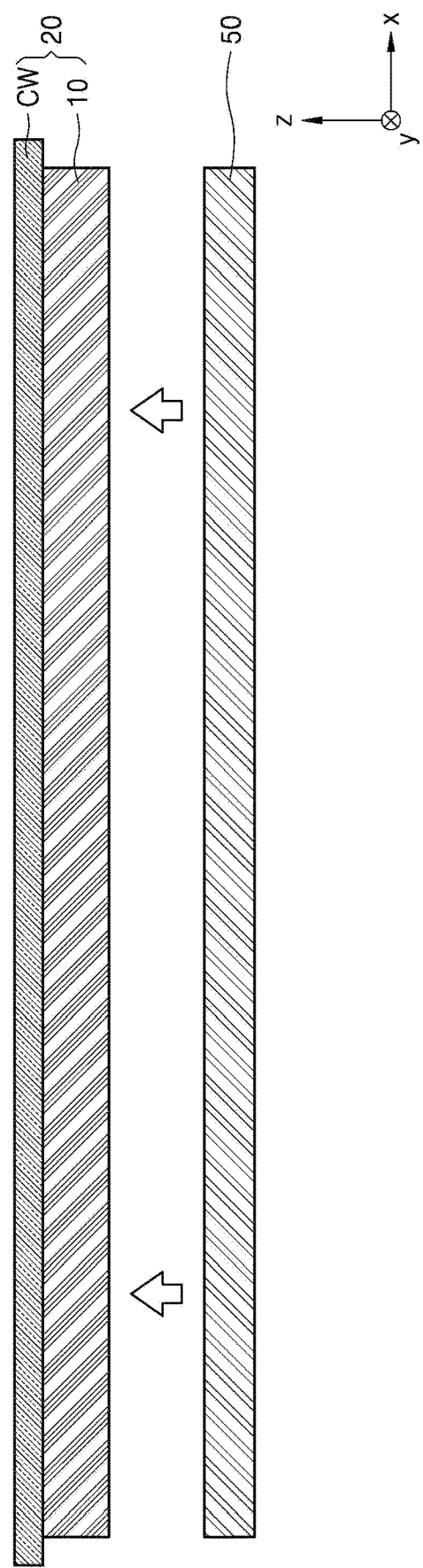
FIGS. 13 to 15 are cross-sectional views schematically illustrating steps of a method of manufacturing a display apparatus according to an embodiment.
Figure 14:
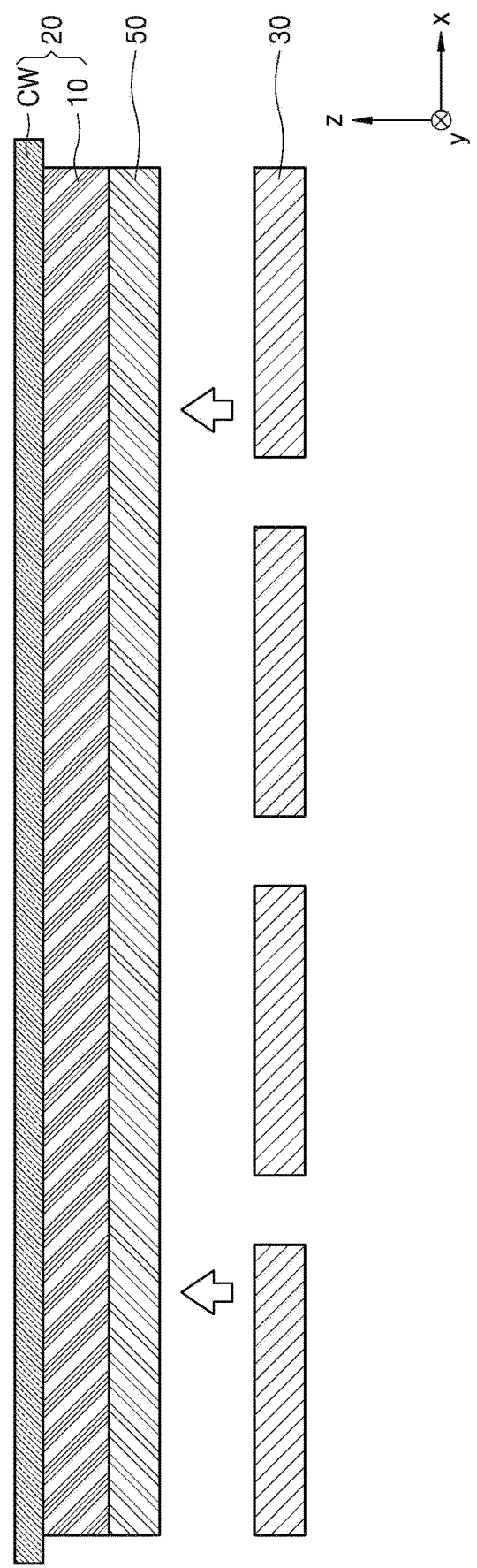
Figure 15:
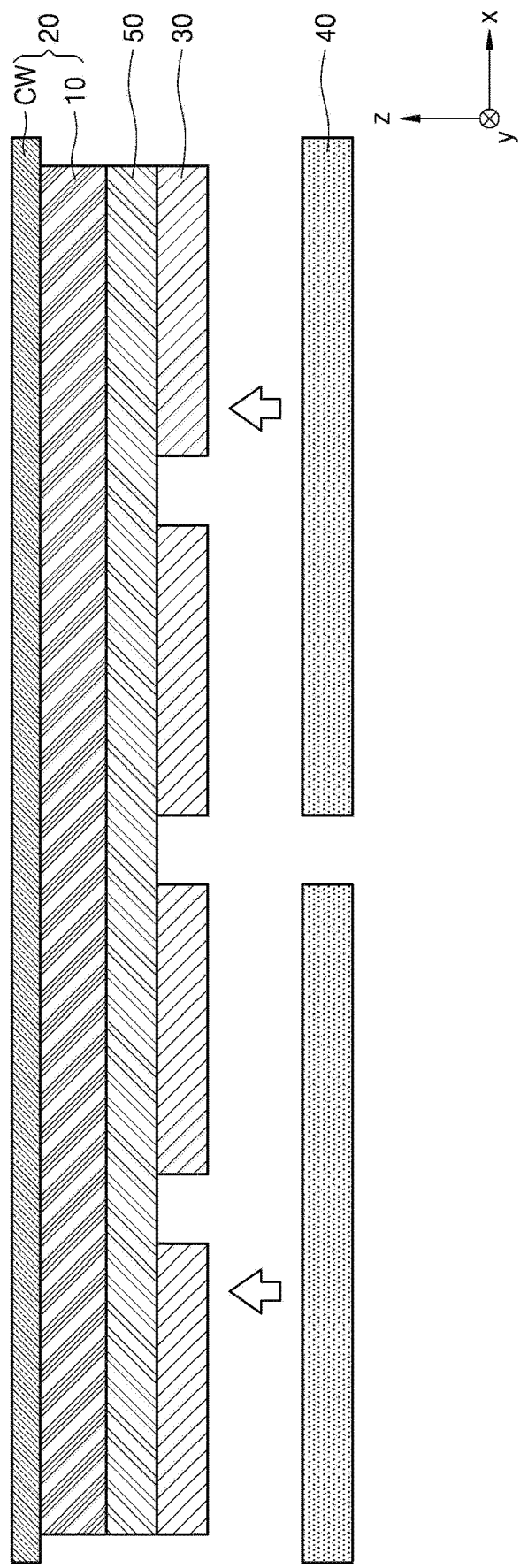

FIGS. 13 to 15 are cross-sectional views schematically illustrating steps of a method of manufacturing a display apparatus according to an embodiment.

Referring to FIG. 13, a display panel 10 may be prepared. A cover window CW may be bonded to the display panel 10. A third layer 50 may be disposed on a surface (e.g., a −z direction surface of FIG. 13) of the display panel 10 opposite to a display surface. The third layer 50 may be bonded to the display panel 10 by an adhesive member. The third layer 50 may be, for example, a protective film layer or a support plate layer.

Referring to FIG. 14, a first layer 30 may be disposed on a lower surface (e.g., a −z direction surface of FIG. 14) of the third layer 50. The first layer 30 may be bonded to the third layer 50 by an adhesive member. The first layer 30 may be bonded to be spaced apart to form a space portion 80 as described above. Also, in an embodiment, the first layer 30 may be disposed to be spaced apart from the center of the folding area FA so as to be cut at the center of the folding area FA when the display panel 10 is folded. The first layer 30 may be, for example, a cushion layer.

Referring to FIG. 15, a second layer 40 may be disposed on a lower surface (e.g., a −z direction surface of FIG. 15) of the first layer 30. The second layer 40 may be bonded to the first layer 30 by an adhesive member. In an embodiment, the second layer 40 may be disposed to be spaced apart from the center of the folding area FA so as to be cut at the center of the folding area FA when the display apparatus is folded. The second layer 40 may be, for example, a digitizer layer.

The method of manufacturing a display apparatus according to an embodiment may be a method of manufacturing the display apparatus described above. Also, an embodiment in which the space portion 80 is arranged in the first layer in the inflection area IA has been primarily described, but the present disclosure is not limited thereto. For example, the space portion 80 may be arranged in the third layer 50 or may be arranged to form a space in (or may extend through) the entire thickness of the first layer 30 and a portion of the thickness of the third layer 50. For example, the space portion 80 may be arranged to form (or may be formed by) a space in a portion of the thickness of the first layer 30 and a portion of the thickness of the third layer 50 (e.g., the first layer 30 and the third layer 50 facing each other may have grooves therein to form the space).

According to one or more embodiments, when the display apparatus is folded, the display apparatus may have a reference (or certain) curvature in the folding area while defects in the display apparatus may be prevented.

The aspects and features of the present disclosure are not limited to the above-described aspects and features, and other aspects and features that are not mentioned herein will be clearly understood by those of ordinary skill in the art.

It should be understood that the embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
 a display module having a folding area and inflection areas respectively on both sides of the folding area in a first direction;
 a third layer on a surface of the display module that is opposite to a display surface of the display module;
 a first layer on a surface of the third layer that is opposite to the display module; and
 a second layer on a surface of the first layer that is opposite to the third layer,
 wherein a first empty space is defined between the display module and the second layer in a thickness direction in at least one of the inflection areas, and a second empty space is defined from the third layer entirely through the first layer and the second layer in the thickness direction at a center of the folding area,
 wherein the second layer extends continuously over the first empty space in the first direction, and
 wherein the first layer is a cushion layer, the second layer is a digitizer layer, and the third layer is a support plate layer.

2. The display apparatus of claim 1, wherein the first layer forms a space portion defining the first empty space.

3. The display apparatus of claim 2, wherein a cross-sectional shape of the space portion in the first direction is rectangular.

4. The display apparatus of claim 2, wherein a cross-sectional shape of the space portion in the first direction is semi-elliptical.

5. The display apparatus of claim 2, wherein a cross-sectional shape of the space portion in the first direction is concave-convex.

6. The display apparatus of claim 2, wherein the space portion is a first space portion,
wherein the first layer forms a second space portion defining the second empty space, and
wherein the first and second space portions are spaced apart from each other in the first direction.

7. The display apparatus of claim 2, wherein the space portion extends through an entire thickness of the first layer.

8. The display apparatus of claim 2, wherein the space portion extends through less than an entire a thickness of the first layer.

9. The display apparatus of claim 2, wherein, when the display module is folded, the inflection areas have an inflection point at which a rate of change of a slope of the display module changes from positive to negative or from negative to positive in the first direction, and
wherein the first empty space is symmetrical with respect to the corresponding inflection point.

10. The display apparatus of claim 9, wherein a height of the space portion is maximum at the inflection point.

11. The display apparatus of claim 1, wherein the first layer comprises a first protective member in the folding area with respect to the inflection areas and a second protective member that is different from the first protective member on a side opposite to the folding area.

12. The display apparatus of claim 11, wherein a rigidity of the second protective member is greater than a rigidity of the first protective member.

13. The display apparatus of claim 1, wherein each of the first layer and the second layer are separated in a center of the folding area.

14. A method of manufacturing a display apparatus, the method comprising:
preparing a display module having a folding area and inflection areas respectively on both sides of the folding area in a first direction;
disposing a third layer on a surface of the display module opposite to a display surface of the display module;
disposing a first layer having a first space portion and a second space portion on a surface of the third layer opposite to the display module to form a first empty space below at least one of the inflection areas and a second empty space at a center of the folding area and continuously extending from the third layer through the first layer; and
disposing a second layer on a surface of the first layer opposite to the third layer to extend continuously over the first empty space in the first direction and having an opening at the center of the folding area open to the second empty space,
wherein the first layer is a cushion layer, the second layer is a digitizer layer, and the third layer is a support plate layer.

15. The method of claim 14, wherein a cross-sectional shape of the first space portion in the first direction is concave-convex.

16. The method of claim 14, wherein the first space portion extends through a portion of a thickness of the first layer.

17. The method of claim 14, wherein the disposing of the first layer comprises:
arranging a first protective member in the folding area of the first layer with respect to the at least one of the inflection areas; and
arranging a second protective member, which is different from the first protective member, on a side opposite to the folding area.

18. The method of claim 17, wherein a rigidity of the second protective member is greater than a rigidity of the first protective member.

19. The method of claim 14, wherein, when the display module is folded, the inflection areas have an inflection point at which a rate of change of a slope of the display module changes from positive to negative or from negative to positive in the first direction, and
wherein the first space portion is symmetrical with respect to the corresponding inflection point.

20. The method of claim 19, wherein the disposing of the first layer comprises disposing the first layer so that a thickness of the first layer is minimum at the inflection point.

* * * * *